US 6,658,468 B1

(12) United States Patent
Charton

(10) Patent No.: US 6,658,468 B1
(45) Date of Patent: Dec. 2, 2003

(54) TELECOMMUNICATION NETWORK USAGE METERING MANAGEMENT ARCHITECTURE

(75) Inventor: Nathalie Charton, Montrouge (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/442,393

(22) Filed: Nov. 18, 1999

(30) Foreign Application Priority Data

Dec. 10, 1998 (FR) ............................................. 98 15578

(51) Int. Cl.[7] ............................................. G06F 15/173
(52) U.S. Cl. ...................... 709/224; 709/202; 709/217; 709/228; 370/404; 370/259; 345/733; 345/744; 379/114
(58) Field of Search ................................. 709/224, 225, 709/200, 202, 203, 208, 209, 217, 219, 228; 370/404, 259; 340/825; 379/114, 112, 58, 59

(56) References Cited

U.S. PATENT DOCUMENTS

| | | | | |
|---|---|---|---|---|
| 3,748,392 | A | * | 7/1973 | Henquet et al. ............. 525/443 |
| 5,784,442 | A | * | 7/1998 | Foti ............................ 455/405 |
| 6,088,659 | A | * | 7/2000 | Kelley et al. ........... 340/870.02 |
| 6,115,646 | A | * | 9/2000 | Fiszman et al. .............. 700/181 |
| 6,115,742 | A | * | 9/2000 | Franklin et al. ............. 709/224 |
| 6,119,160 | A | * | 9/2000 | Zhang et al. ................ 709/224 |
| 6,199,068 | B1 | * | 3/2001 | Carpenter .............. 340/870.03 |
| 6,240,079 | B1 | * | 5/2001 | Hamalainen et al. ........ 370/337 |
| 6,327,619 | B1 | * | 12/2001 | Blumenau .................... 709/224 |
| 6,430,619 | B1 | * | 8/2002 | Sitaraman et al. ........... 709/225 |
| 6,446,977 | B1 | * | 9/2002 | Thiede ......................... 277/501 |
| 6,466,786 | B1 | * | 10/2002 | Wallenius .................... 455/433 |

FOREIGN PATENT DOCUMENTS

EP    0 483 091 A2    4/1992
EP    0 876 047 A2    11/1998

OTHER PUBLICATIONS

Wang–Chien Lee et al.: "A Framework for TMN–CORBA Interoperability" Proceedings of the 1998 IEEE Network Operations and Management Symposium, Noms 98, Conference Proceedings (CAT. No. 98 CH36158), Feb. 15–20, 1998, pp. 90–99 vol. 1, XP000799764.

* cited by examiner

Primary Examiner—David Wiley
Assistant Examiner—Phuoc H. Nguyen
(74) Attorney, Agent, or Firm—Sughrue Mion, PLLC

(57) ABSTRACT

A telecommunication usage metering management architecture includes a telecommunication network formed of a plurality of hierarchically structured elements and a management system comprising a hierarchical set of software components. Each software component is associated with an element of the telecommunication network and each hierarchical level of the set corresponds to a hierarchical level of the telecommunication network. At least one of the software components can send messages to at least one usage metering system. Only the lowest level software resources can access information contained in the network elements and relating to the use of the associated network elements.

6 Claims, 2 Drawing Sheets

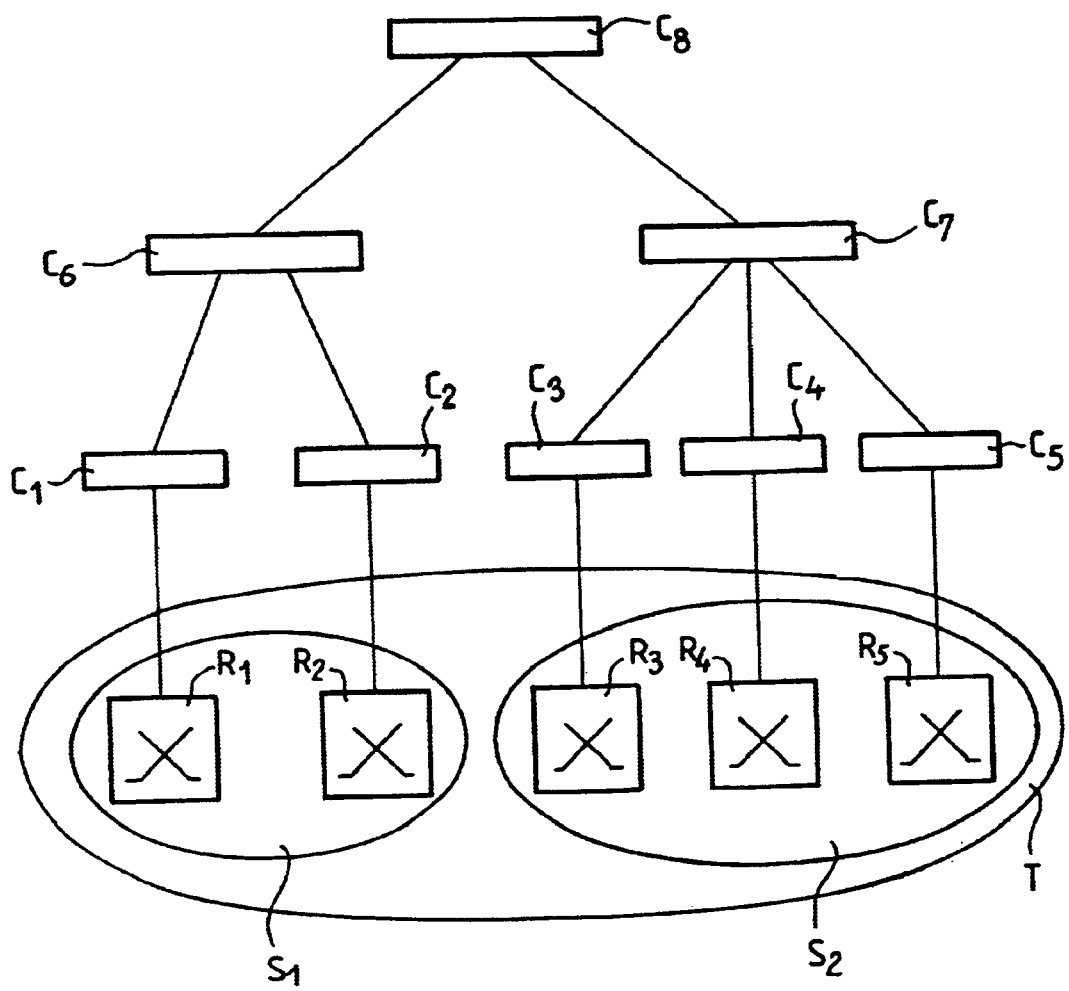

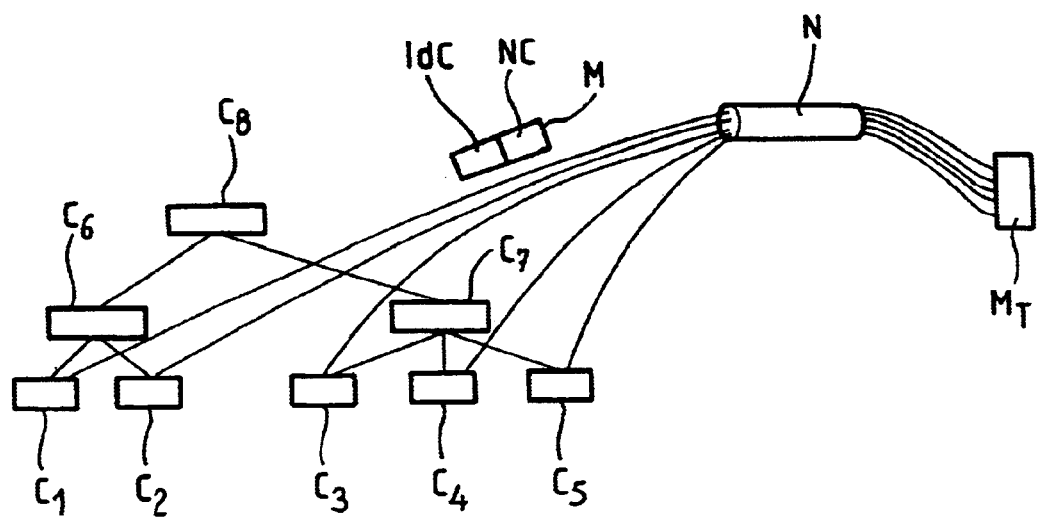
FIG_2a
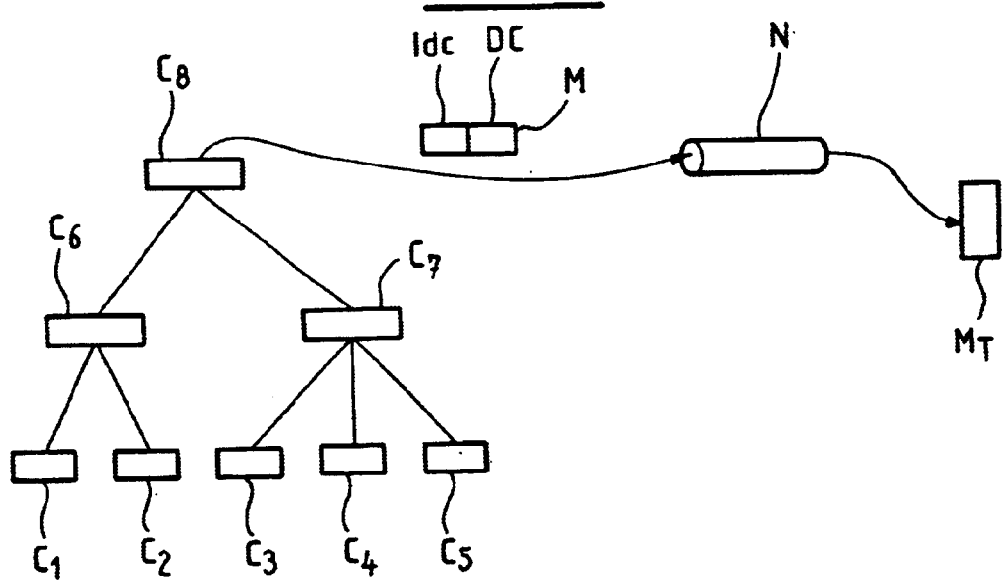
FIG_2b

TELECOMMUNICATION NETWORK USAGE METERING MANAGEMENT ARCHITECTURE

BACKGROUND OF THE INVENTION

1. Field of the invention

The present invention concerns an architecture providing a usage metering service in a telecommunication network management system.

The invention is more particularly applicable to telecommunication management networks (TMN) as defined in the M.3000 series recommendations of the ITU-T (International Telecommunication Union—Telecommunication Standardization Section).

2. Description of the prior art

Usage metering is one of the five major families of management services of the OSI (Open System Interaction) architecture jointly defined by the ISO (International Standardization Organization) and the ITU-T.

Those families, referred to as functional areas in the terminology specific to the OSI architecture, are:

Fault management,

Usage metering management,

Configuration management,

Performance management, and

Security management.

The usage metering management service is more particularly described in ITU-T Recommendation X.742 "Information technology—Open Systems Interconnection—Systems management: Usage metering function for accounting purposes".

The recommendation specifies only low-level components and does not describe how they are to be adapted to form a usage metering service.

In a telecommunication network, when a call terminates, the exchange of the calling party sends to a billing center a billing docket containing information on the call needed at the billing center (call duration, usage metering area, etc).

In an intelligent network conforming to the Q.1200 series recommendations of the ITU-T, the services issue an equivalent of the billing dockets.

Thus existing solutions depend on the architecture of the telecommunication network and in particular on the billing dockets issued by the exchanges or by the services of the intelligent network.

The object of the present invention is to provide means for implementing usage metering policies independently of the underlying telecommunication network and the services using the network.

SUMMARY OF THE INVENTION

To achieve the above objects, the invention provides a telecommunication usage metering management architecture including a telecommunication network formed of a plurality of hierarchically structured elements and management means comprising a hierarchical set of software components, each software component being associated with an element of the telecommunication network and each hierarchical level of the set corresponding to a hierarchical level of the telecommunication network, at least one of the software components including means for sending messages to at least one usage metering unit, and only the lowest level software resources having means for access to information contained in the network elements and relating to the use of the associated network elements.

Particular embodiments of the invention can comprise one or more of the following features:

The messages are notifications which are transmitted to the at least one usage metering unit by one or more notification services.

The notifications and the notification service(s) are supported by a CORBA software architecture.

The at least one usage metering unit transmits to some of the software components a policy for setting parameters of the at least one message sending unit.

The information relating to a call is transmitted at the end of the call in one or more of the messages.

The information relating to a call is transmitted periodically in one or more of the messages.

The management means further include means for setting up and interrupting calls within the telecommunication network, conforming to the specifications of the TINA consortium, for example.

Accordingly, using an architecture according to the invention, usage metering becomes independent of the underlying telecommunication network. This has two distinct advantages:

On the one hand, the information issued by the components of the architecture in accordance with the invention is generic, i.e. independent of the resources of the underlying network, which means that usage metering is no longer tied to specific information contained in the billing dockets issued by the resources of a particular network.

On the other hand, changing a network resource (for example an exchange) does not modify in any way the existing usage metering policy.

In the same manner, information issued by the components of the architecture of the invention is generic, i.e. identical for all the services supported, and so any usage metering policy can be implemented and no longer depends exclusively on specific information contained in the dockets emanating from the network or the particular services.

A further advantage is that billing can use several levels of information. For example, it is possible for billing to be based on actual use of exchanges, the number of sub-networks used, etc.

Other advantages and features of the invention will become apparent in the course of the following detailed description of various embodiments of the invention given with reference to the accompanying drawings.

BRIEF DESCRIPTION OF THE DRAWINGS

FIG. 1 is a diagram showing the usage metering management architecture of the invention.

FIGS. 2a and 2b show two particular embodiments of that architecture.

DETAILED DESCRIPTION OF THE PREFERRED EMBODIMENTS

The telecommunication network T shown in FIG. 1 has three hierarchical levels. The first level is formed by the telecommunication network itself, which is divided into a plurality of sub-networks $S_1$, $S_2$ each having one or more network resources $R_1$, $R_2$, $R_3$, $R_4$, $R_5$. The telecommunication network T, the sub-networks $S_1$, $S_2$ and the network resources $R_1$, $R_2$, $R_3$, $R_4$, $R_5$ are referred to as network elements.

Each network element is associated with a software component of the architecture structured in accordance with the invention.

The network resources $R_1$, $R_2$, $R_3$, $R_4$, $R_5$ are associated with the lowest level software components $C_1$, $C_2$, $C_3$, $C_4$, $C_5$, respectively. The sub-networks $S_1$ and $S_2$ are associated with the software components $C_6$ and $C_7$ of the intermediate hierarchy level. Finally, the network itself is associated with the highest level software component $C_8$.

Each software component can include means for sending messages to a usage metering unit. Messages from a given software component include information relating to the use of the network element with which it is associated.

The lowest level software components can communicate with interfaces that provide access to the network resources in order to obtain information relating to the use thereof. The information can be stored in databases referred to as MIB (Management Information Bases). The lowest level software components can access the MIB via those interfaces using a communication protocol such as CMIP (Common Management Information Protocol) specified by ITU-T Recommendation X.710 or the SNMP (Simple Network Management Protocol).

The lowest level software components can therefore access precise information relating to the resources of the network. This information can be:

a the real use of resources, i.e. the bit rate or, for example, the number of cells passing through an exchange for a given call, an error rate, for example, the number of erroneous cells which it has not been possible to transmit.

The information can then be fed back to higher level software components for collation.

In one particular embodiment of the invention, the hierarchy of software components is coincident with a connection manager, in particular a connection manager conforming to the specifications of the TINA (Telecommunication Information Networking Architecture) consortium. According to those specifications, the connection manager is used for the initialization of a call in the telecommunication network.

The initialization request is sent to the highest level software component and then propagated through the hierarchy of software components.

For example, and referring to FIG. 1, if the call requires connection of resources $R_1$ and $R_4$, then the highest level software component $C_8$ propagates the request to the two software components on the next level down which govern the software components associated with those resources, i.e. the software components $C_6$ and $C_7$. Each of those software components then propagates the request to the software component associated with the resources for connecting the requested resources, i.e. $C_1$, $C_2$, $C_3$ and $C_4$.

The software components $C_1$, $C_2$, $C_3$ and $C_4$ which are able to communicate with the resources $R_1$, $R_2$, $R_3$ and $R_4$ can then configure the resources to enable the connection to be set up and thereby to enable the call.

By virtue of the above mechanism, the various software components have information relating to the calls in progress on the telecommunication network.

In one particular embodiment of the invention, the usage metering unit(s) transmit a policy to some software components for setting parameters of the message sending unit.

In particular, in this way it is possible to set parameter values such as:

The information, from among the available generic information, they will send to the usage metering unit.

The time at which the information will be transmitted. For example, the information can be transmitted when the call terminates or periodically (daily, monthly, etc).

In one particular embodiment of the invention, the messages sent by the software components are notifications, i.e. messages sent to an asynchronous base. These notifications are sent to one or more notification services with which the usage metering unit(s) are registered. Thus a usage metering unit registered with a notification service receives notifications from the software components.

The architecture of the invention can be implemented on a CORBA (Common Object Request Broker Architecture) platform conforming to the specifications of the OMG (Open Management Group). In this case, the notification service can be a notification service in accordance with those specifications.

Other implementations are possible, in particular ones not using notifications. For example, the messages can be responses to requests from the usage metering unit.

The usage metering unit can bill on the basis of this information and according to the nature of the information received.

The dependent relationship can be an extremely simple one: a call can be billed by the product of a unit charge and the real use of resources.

Other solutions are clearly feasible. In particular:

It is possible to take account of an error rate and/or a grade of service measured at the level of the network resources, in order to apply usage metering at a decreasing rate as call quality deteriorates, or to avoid billing for cells that have not been transmitted.

Usage metering can be applied differently to some sub-networks.

Usage metering can be varied according to the time of day.

The above list is naturally not exhaustive.

FIG. 2a shows one particular embodiment of the invention. In this embodiment, there is only one usage metering unit. A policy is sent to the software components indicating that only the lowest level software components ($C_1$, $C_2$, $C_3$, $C_4$ and $C_5$) send messages M.

The messages M contain a call identifier ldC and the number NC of cells that have passed through the exchange for the call in question.

These messages are sent to a notification service N when the call terminates.

On receiving these messages, the usage metering unit $M_T$ collates the information received from the various software components corresponding to the various network resources used by the call.

FIG. 2b shows a second embodiment of the invention.

A policy sent to the software components indicates that only the highest level software component $C_8$ must send messages M.

The messages M contain a call identifier ldC and the duration DC of the corresponding call. They are sent periodically (for example at the end of each month) to the usage metering unit $M_T$.

What is claimed is:

1. A telecommunication usage metering management architecture, comprising:

a telecommunication network formed of a plurality of hierarchically structured network elements, and management means comprising a hierarchical set of software components;

wherein:
  each software component of said hierarchical set of software components is associated with a corresponding network element of said plurality of hierarchically structured network elements,
  each hierarchical level of said hierarchical set of software components corresponds to a hierarchical level of said telecommunication network,
  at least one of said hierarchical set of software components includes means for sending messages to at least one usage metering unit, and
  only ones of said hierarchical set of software components in the lowest hierarchical level have means for access to information contained in and relating to the use of said corresponding network elements in a call, and
  wherein said information relating to the use of said corresponding network element in a call is transmitted periodically in one or more of said messages.

2. The architecture claimed in claim 1, wherein said messages are notifications transmitted to said at least one usage metering unit by one or more notification services.

3. The architecture claimed in claim 2, wherein said notifications and said one or more notification services are supported by a CORBA software architecture.

4. The architecture claimed in claim 1, wherein said information relating to the use of said corresponding network element in a call is transmitted at the end of said call in one or more of said messages.

5. The architecture claimed in claim 1, wherein said management means further comprises means for setting up and interrupting calls within said telecommunication network.

6. A telecommunication usage metering management architecture, comprising:
  a telecommunication network formed of a plurality of hierarchically structured network elements, and
  management means comprising a hierarchical set of software components;
wherein:
  each software component of said hierarchical set of software components is associated with a corresponding network element of said plurality of hierarchically structured network elements,
  each hierarchical level of said hierarchical set of software components corresponds to a hierarchical level of said telecommunication network,
  at least one of said hierarchical set of software components includes means for sending messages to at least one usage metering unit,
  only ones of said hierarchical set of software components in the lowest hierarchical level have means for access to information contained in and relating to the use of said corresponding network elements in a call, and
  said at least one usage metering unit transmits, to some of said hierarchical set of software components, a policy setting parameters of said means for sending messages.

* * * * *